(12) United States Patent
Pruet, III

(10) Patent No.: US 7,177,886 B2
(45) Date of Patent: Feb. 13, 2007

(54) APPARATUS AND METHOD FOR COORDINATING LOGICAL DATA REPLICATION WITH HIGHLY AVAILABLE DATA REPLICATION

(75) Inventor: Clarence Madison Pruet, III, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 10/360,403

(22) Filed: Feb. 7, 2003

(65) Prior Publication Data

US 2004/0158588 A1  Aug. 12, 2004

(51) Int. Cl.
*G06F 17/30* (2006.01)

(52) U.S. Cl. ............ 707/204; 707/202; 707/203; 707/1; 709/203; 370/389

(58) Field of Classification Search ........ 707/202–204, 707/1; 370/389; 709/203
See application file for complete search history.

(56) References Cited

U.S. PATENT DOCUMENTS

| | | | |
|---|---|---|---|
| 5,594,900 A | 1/1997 | Cohn et al. | |
| 5,640,561 A | 6/1997 | Satoh et al. | |
| 5,842,222 A | 11/1998 | Lin et al. | |
| 6,148,412 A | 11/2000 | Cannon et al. | |
| 6,199,069 B1 | 3/2001 | Dettinger et al. | |
| 6,199,074 B1 | 3/2001 | Kern et al. | |
| 6,243,715 B1 | 6/2001 | Bogantz et al. | |
| 6,269,432 B1 | 7/2001 | Smith | |
| 6,289,357 B1 | 9/2001 | Parker | |
| 6,292,905 B1 | 9/2001 | Wallach et al. | |
| 6,304,882 B1 * | 10/2001 | Strellis et al. | 707/202 |
| 6,324,693 B1 | 11/2001 | Brodersen et al. | |
| 6,405,220 B1 | 6/2002 | Brodersen et al. | |
| 6,408,310 B1 | 6/2002 | Hart | |
| 6,421,688 B1 | 7/2002 | Song | |

(Continued)

OTHER PUBLICATIONS

"Efficient Logging of Transactions on Persistent Information in General and Databases in Particular", IBM Technical Disclosure Bulletin, vol. 40, No. 11, Nov. 1997, pp. 117-120.

(Continued)

*Primary Examiner*—Sathyanarayan Pannala
(74) *Attorney, Agent, or Firm*—Fay, Sharpe, Fagan, Minnich & McKee, LLP

(57) ABSTRACT

In a database apparatus (10), a critical database server (12) includes a primary server (20) supporting a primary database instance and a secondary server (22) supporting a secondary database instance that mirrors the primary database instance. The secondary server (22) generates an acknowledgment signal (60) indicating that a selected critical database transaction (42) is mirrored at the secondary database instance. A plurality of other servers (14, 16, 18) each support a database. A data replicator (30) communicates with the critical database server (12) and the other servers (14, 16, 18) to replicate the selected critical database transaction (42) on at least one of said plurality of other servers (14, 16, 18) responsive to the acknowledgment signal (60).

10 Claims, 6 Drawing Sheets

U.S. PATENT DOCUMENTS

| | | | |
|---|---|---|---|
| 6,446,075 B1 | 9/2002 | Velasco | |
| 6,654,891 B1 * | 11/2003 | Borsato et al. | 726/6 |
| 6,671,757 B1 * | 12/2003 | Multer et al. | 710/100 |
| 7,065,541 B2 | 6/2006 | Gupta et al. | |
| 2002/0116457 A1 * | 8/2002 | Eshleman et al. | 709/203 |
| 2002/0163910 A1 * | 11/2002 | Wisner et al. | 370/389 |
| 2005/0114285 A1 * | 5/2005 | Cincotta | 707/1 |

OTHER PUBLICATIONS

Abstracted Patent No. JP200259473 of Shibata Hirohito, Entitled: Database Management System, Publication Date Sep. 22, 2000.

IBM Technical Disclosure Bulletin, vol. 30, No. 4, Sep. 1987, pp. 1738-1740 - Database Recovery Using A Transaction Log File.

* cited by examiner

APPARATUS AND METHOD FOR COORDINATING LOGICAL DATA REPLICATION WITH HIGHLY AVAILABLE DATA REPLICATION

BACKGROUND OF THE INVENTION

The present invention relates to the information arts. In finds particular application in relational database systems that distribute data across a plurality of computers, servers, or other platforms, and will be described with particular reference thereto. However, the invention also finds application in many other systems including distributed information systems, in information backup systems, and the like.

Relational database systems are widely used in business, government, and other organizations to record, store, process, share, and otherwise manipulate information. Because such organizations are commonly regional, national, or global in scope, the relational database is preferably accessible from regionally, nationally, or globally distributed computers, terminals, or other devices across local area networks, Internet links, wireless links, and other communication pathways. For example, worldwide offices of a corporation preferably access a single corporate database or selected portions thereof.

A problem arises in that accessing a single database by a large number of remote computer systems creates substantial communication and data processing bottlenecks that limits database speed. To overcome such bottlenecks, a distributed database system is used, in which database information is shared or distributed among a plurality of database servers that are distributed across the communication network.

A distributed database system typically includes a central database and various remote databases that are synchronized with the central database using various techniques. The remote databases can contain substantially the entire central database contents, or selected portions thereof. Moreover, transactions can be generated at the central database server or at one of the remote servers. In a commercial enterprise, for example, remote database servers at sales offices receive and generate purchase order transactions that propagate by data distribution to the central database server and in some cases to other database servers. Similarly, remote servers at billing centers generate sales invoice transactions that propagate through the distributed database system, and so forth. The central database server provides a repository for all database contents, and its contents are preferably highly robust against server failures.

To provide for recovery in the event that the central database fails, the central database can include primary and secondary database instances. The secondary database instance mirrors the primary database instance and acts as a hot backup providing failover recovery in the event of a primary database failure. Mirroring is maintained by shipping logical log files of the primary database instance to the secondary instance as they are being copied to disk or other non-volatile storage on the primary instance. The secondary instance remains in recovery mode as it is receiving and processing the shipped logical log files. Since all log records are processed at the secondary instance, the secondary instance provides a mirror image backup of the primary database instance, except for recent transactions that may not have been copied to the secondary instance yet. The primary and secondary database instances are in some cases configured such that a transaction commit is not completed at the primary until the log of that transaction is shipped to the secondary instance. Such a central database is robust against primary database failure and provides a fail-safe solution for high availability. However, it is limited in functionality, supporting only a single or limited number of synchronized secondary instances, which must be substantially compatible. For example, the primary log records should be interpretable by the secondary server without introducing substantial translation processing overhead.

Remote databases which store some or all information contained in the central database are typically maintained by synchronous or asynchronous data replication. In synchronous replication, a transaction updates data on each target remote database before completing the transaction. Synchronous replication provides a high degree of reliability and substantially reduced latency. However, synchronous replication introduces substantial delays into data processing, because the replication occurs as part of the user transaction. This increases the cost of the transaction, and can make the transaction too expensive. Moreover, a problem at a single database can result in an overall system failure. Hence, synchronous replication is usually not preferred except for certain financial transactions and other types of transactions which require a very high degree of robustness against database failure.

Asynchronous replication is preferred for most data distribution applications. In asynchronous replication, transaction logs of the various database servers are monitored for new transactions. When a new transaction is identified, a replicator rebuilds the transaction from the log record and distributes it to other database instances, each of which apply and commit the transaction at that instance. Such replicators have a high degree of functionality, and readily support multiple targets, bi-directional transmission of replicated data, replication to dissimilar machine types, and the like. However, asynchronous replicators have a substantial latency between database updates, sometimes up to a few hours for full update propagation across the distributed database system, which can lead to database inconsistencies in the event of a failure of the central database server. Hence, asynchronous replicators are generally not considered to be fail-safe solutions for high data availability.

Therefore, there remains a need in the art for a method and apparatus for fail-safe data replication in a distributed database system, which provides for reliable fail-safe recovery and retains the high degree of functionality of asynchronous replication. Such a method and/or apparatus should be robust against a failure at a critical node within the replication domain, and should ensure the integrity of transaction replications to other servers within the replication domain in the face of such a critical node failure.

The present invention contemplates an improved method and apparatus which overcomes these limitations and others.

SUMMARY OF THE INVENTION

In accordance with one aspect, a database apparatus includes a critical database server having a primary server supporting a primary database instance and a secondary server supporting a secondary database instance that mirrors the primary database instance. The secondary server generates an acknowledgment signal indicating that a selected critical database transaction is mirrored at the secondary database instance. A plurality of other servers each support a database. A data replicator communicates with the critical database server and the other servers to replicate the selected critical database transaction on at least one of said plurality of other servers responsive to the acknowledgment signal.

In accordance with another aspect, a method is provided for integrating a high availability replication system that produces at least one mirror of a critical database node, with a data distribution replication system that selectively replicates data at least from the critical database node to one or more remote databases. In the data distribution replication system, an object at the critical database node targeted for replication is identified. In the high availability replication system, objects including the identified object are replicated at the mirror and a mirror acknowledgment indicative of completion of replication of the identified object at the mirror is generated. In the data distribution replication system, the identified object is replicated responsive to the mirror acknowledgment.

In accordance with another aspect, a method is provided for coordinating data replication to distributed database servers with a hot-backup instance of a database. Database transactions are backed up at the hot-backup instance. A backup indicator is maintained that identifies database transactions backed up at the hot-backup source. Data replication of a database transaction is delayed until the backup indicator identifies the database transaction as having been backed up at the hot-backup source.

In accordance with yet another aspect, an article of manufacture includes a program storage medium readable by a computer and embodying one or more instructions executable by the computer to perform process operations for executing a command to perform a database operation on a relational database connected to the computer. A transaction performed in the relational database is identified. The identified transaction is replicated responsive to an indication that the identified transaction has been backed up at the relational database.

In accordance with still yet another aspect, an apparatus for supporting a distributed relational database includes primary and secondary servers. The primary server supports a primary database instance that includes a primary database instance log file. The secondary server supports a secondary database instance that includes a secondary instance log file. A plurality of other servers each support a database instance. A highly available data replication component communicates with the primary and secondary servers to transfer primary database instance log file entries from the primary server to the secondary server. The secondary server produces an acknowledgment indicating that the transferred log file entries have been received. A logical data replication component communicates with the primary server and the other servers to identify a log record in the primary database instance log file, construct a replication transaction corresponding to the identified log record, and, responsive to the highly available data replication component indicating that the identified log record has been received at the secondary server, cause one or more of the other servers to perform the replication transaction.

One advantage resides in avoiding data inconsistencies among remote servers in the event of a failure of the central database primary server.

Another advantage resides providing asynchronous replication functionality that is robust with respect to primary database failure.

Yet another advantage resides in providing for fail-safe recovery via a high availability replication system, while retaining the broad functionality of data distribution by asynchronous replication.

Still further advantages and benefits will become apparent to those of ordinary skill in the art upon reading and understanding the following detailed description.

BRIEF DESCRIPTION OF THE DRAWINGS

The invention may take form in various components and arrangements of components, and in various process operations and arrangements of process operations. The drawings are only for the purposes of illustrating preferred embodiments and are not to be construed as limiting the invention.

DETAILED DESCRIPTION OF THE PREFERRED EMBODIMENTS

Figure 1:
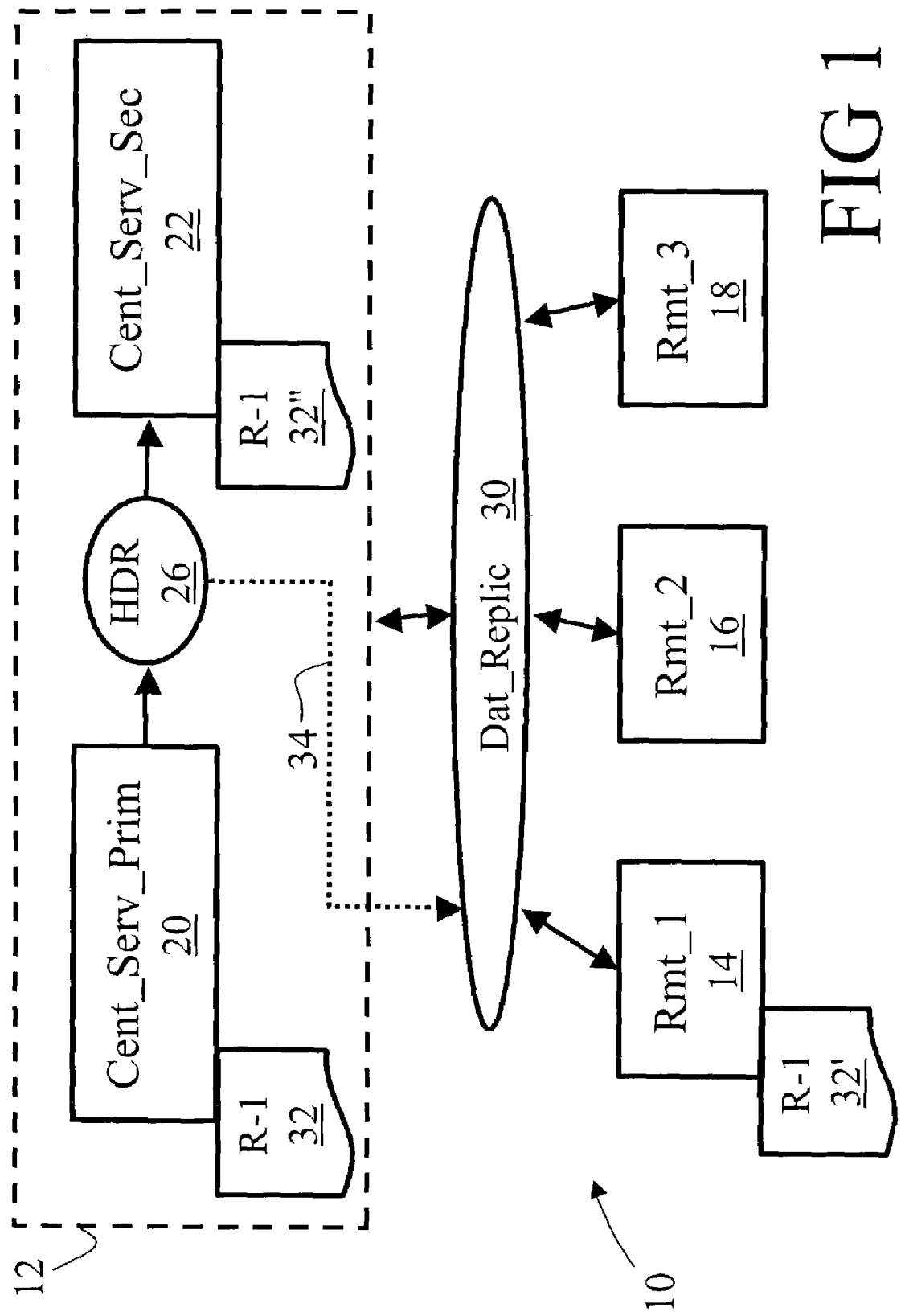
FIG. 1 is a block diagram showing a distributed relational database system including a central database server with a primary database server and a hot-backup secondary database server, a highly available data replication component for maintaining the hot-backup secondary database, and a logical data replication component for selectively distributing data amongst remote servers and the central database.

With reference to FIG. 1, a distributed relational database system 10 of a spokes-and-hub topology includes a central database server 12 and a plurality of remote database servers 14, 16, 18. The central database server 12 includes a primary server 20 and a secondary server 22 that mirrors the primary server 20. The mirroring is provided by a highly available data replication (HDR) component 26 that transfers log records of the central database primary server 20 to the secondary server 22. The log records are applied and logged at the secondary server 22. In this manner, the secondary server 22 is maintained as a mirror image of the primary server 20, except for a set of most recent primary server transactions which may not yet have been transferred by the highly available data replication component 26.

Although the primary and secondary server components 20, 22 of the central database 12 are shown together in FIG. 1, the combination is a logical combination, and is not in general a physical combination. That is, the primary and secondary server components 20, 22 can be spatially remote from one another and in operative communication via a communication network, which may also include the remote servers 14, 16, 18. The servers 20, 22 are preferably logically compatible. For example, the log files of the primary server 20 are preferably readily interpretable by the secondary server 22 without computationally intensive translation processing.

The distributed database 10 is of the spokes-and-hub topology, in which there is one critical node, namely the central database server 12, which serves as the hub. The plurality of remote database servers 14, 16, 18 are spokes that connect at the hub. The central database server 12 is a critical node because a failure of that server results in service interruption for a number of other servers, such as the remote database servers 14, 16, 18. Rather than a spokes-and-hub topology, other topologies can be employed, such as a tree topology, in which there is more than one critical node. In topologies which include more than one critical node, each critical node is preferably supplied with its own highly available data replication (HDR) hot backup.

Data distribution by asynchronous replication amongst the primary server 12 and the remote servers 14, 16, 18 of the database system 10 is performed by an asynchronous logical data replication component 30. The data replication component 30 produces computation threads that monitor transaction logs of the primary server 20 of the central database 12 and of the remote servers 14, 16, 18 to identify recent transactions. Advantageously, such log monitoring does not significantly slow operation of the servers 12, 14, 16, 18. When a recently logged transaction is identified, the data replication component 30 constructs one or more replication transactions that effect replication of the logged transaction.

Because replication transactions are generated by the data replication component 30, the replication transaction can be different in form but equivalent in function to the original transaction. This allows the central database server 12 and the various remote database servers 14, 16, 18 to be dissimilar, for example with respect to operating system, computer type, and the like. Replication to multiple targets, bi-directional transmission of replicated data, replication to dissimilar machine types, and the like are readily supported by the data replication component 30. Data replication can also be selective. That is, only certain data on the central database 12 or the remote servers 14, 16, 18 can be replicated to selected remote servers 14, 16, 18. For example, if remote servers 14, 16, 18 are Eastern, Midwestern, and Western regional servers, then data is suitably regionally filtered and selectively distributed to the appropriate regional remote server 14, 16, 18 by the data replication component 30.

In FIG. 1, an exemplary row insertion "R-1" transaction 32 is performed at the primary server 20 of the central database 12. Although an exemplary row insertion transaction is described herein for purposes of illustrating a preferred embodiment, substantially any type of relational database transaction can be similarly processed. The row insertion transaction 32 is logged at the primary database, identified by the data replication component 30, and a replication transaction 32' is generated. However, the replication transaction 32' is not immediately sent to the remote servers 14, 16, 18. Rather, the data replication component 30 initially waits for an indication that the transaction 32 has been backed up at the secondary server 22 of the central database 12 before sending it to the remote servers 14, 16, 18.

Specifically, in the embodiment of FIG. 1 the highly available data replication component 26 transfers recent log records of the primary server 20, including a log record of the row insertion transaction 32, to the secondary server 22. At the secondary server 22, the transferred log records are applied and logged, including a row insertion transaction 32" that mirrors the row insertion transaction 32 which was performed at the primary server 20. The secondary server 22 generates an acknowledgment indicating that the row insertion transaction 32" is applied and logged.

In response to this acknowledgment, the highly available data replication component 26 produces a mirror acknowledgment 34 indicating that the transaction 32 of the primary server 20 is mirrored at the secondary server 22. Responsive to the mirror acknowledgment 34, the data replication component 30 begins sending the replication transaction 32' to the remote servers 14, 16, 18.

Figure 2:
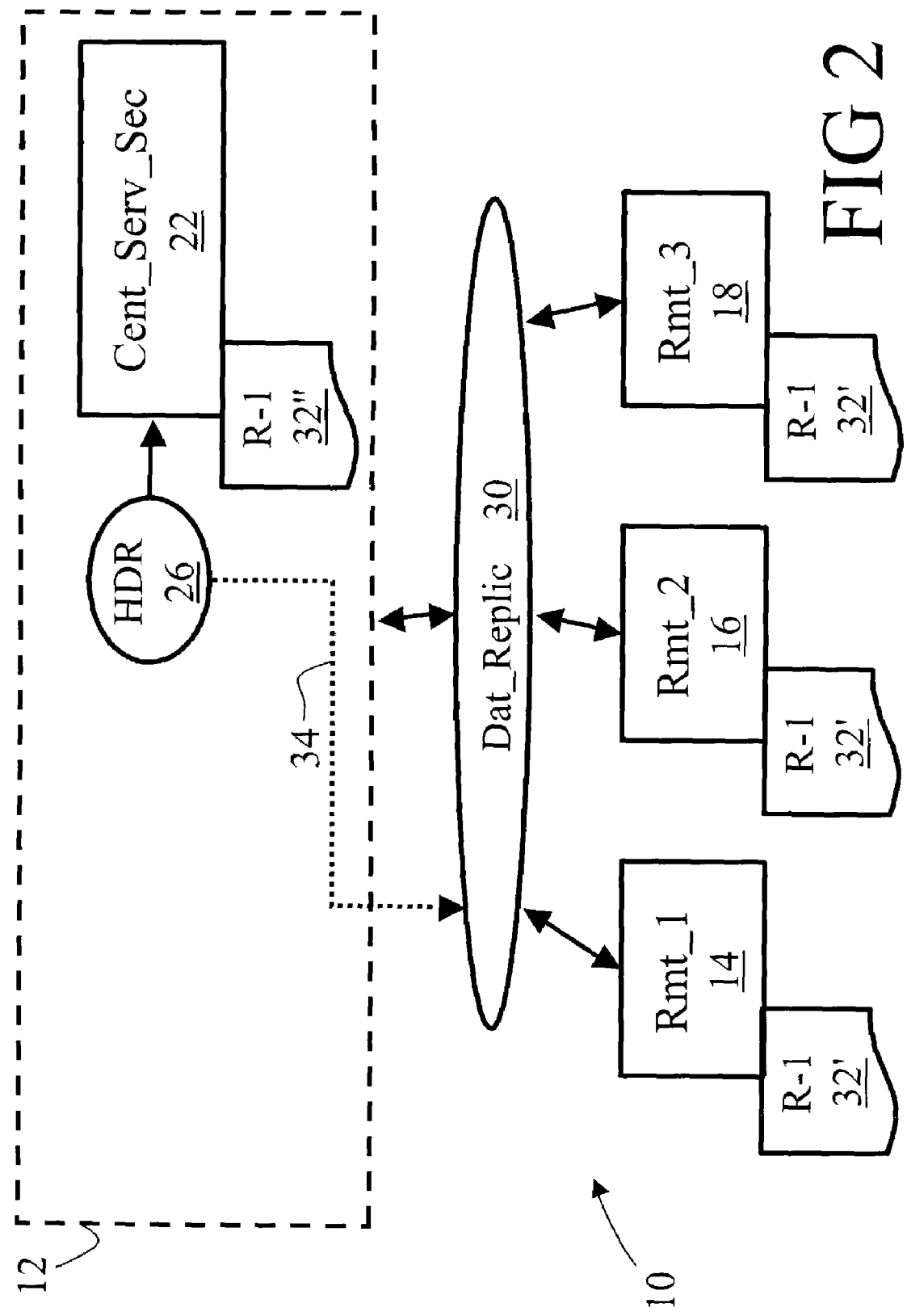
FIG. 2 is a block diagram showing the distributed relational database system of FIG. 1 after the primary server of the central database server has failed and failover recovery control has passed to the secondary database server.

With continuing reference to FIG. 1 and with further reference to FIG. 2, a significant advantage of delaying transmission of the replication transaction 32' to the remote servers 14, 16, 18 until receipt of the mirror acknowledgment 34 is described. In FIG. 2, the primary server 20 of the central database 12 is shown by its absence in FIG. 2 as having failed after the transaction 32' has been transmitted to the remote server 14, but before the transaction 32' has been transmitted to the remote servers 16, 18. Because the data replication component 30 delayed sending the transaction 32' until after receipt of the mirror acknowledgment 34, it is assured that the transaction 32 is mirrored at the secondary server 22 by the mirror transaction 32" before the replication transaction is distributed. Moreover, the replication transaction 32' remains queued for sending at the data replication component 30, which continues to forward the replication transaction 32' to the remaining remote servers 16, 18 so that all remote servers 14, 16, 18 scheduled for receipt of the replication transaction 32' actually receive the transaction. As a result, there are no data inconsistencies between the central database server 12 and the remote servers 14, 16, 18.

In contrast, in a conventional arrangement in which there are no delays, replication transactions are transmitted as soon as they are reconstructed. As a result, none, some, or all of the remote servers may or may not receive the replication transaction in the event of a failure of the central database primary server. Furthermore, the transaction being replicated may or may not have been copied to the secondary server prior to failover. Thus, data inconsistencies may result between the remote servers, and between remote servers and the central database server, in the event of a failure of the central database primary server.

In addition to the highly available data replication component 26 providing the synchronizing mirror acknowledgment 34, to ensure data consistency in the event of a failover recovery, the data replicator 30 preferably generates transaction replication threads that communicate only with the primary server 20, and not with the secondary server 22. In its preferred form, this is accomplished during replication thread generation by checking whether a server of the replication thread is acting as a secondary server of a highly available data replication component. If it is, then the thread is canceled or a suitable error indicator generated. Preferably, the distributed database 10 is configured so that the central server 12 appears as a single logical entity to the data replicator 30.

Figure 3:
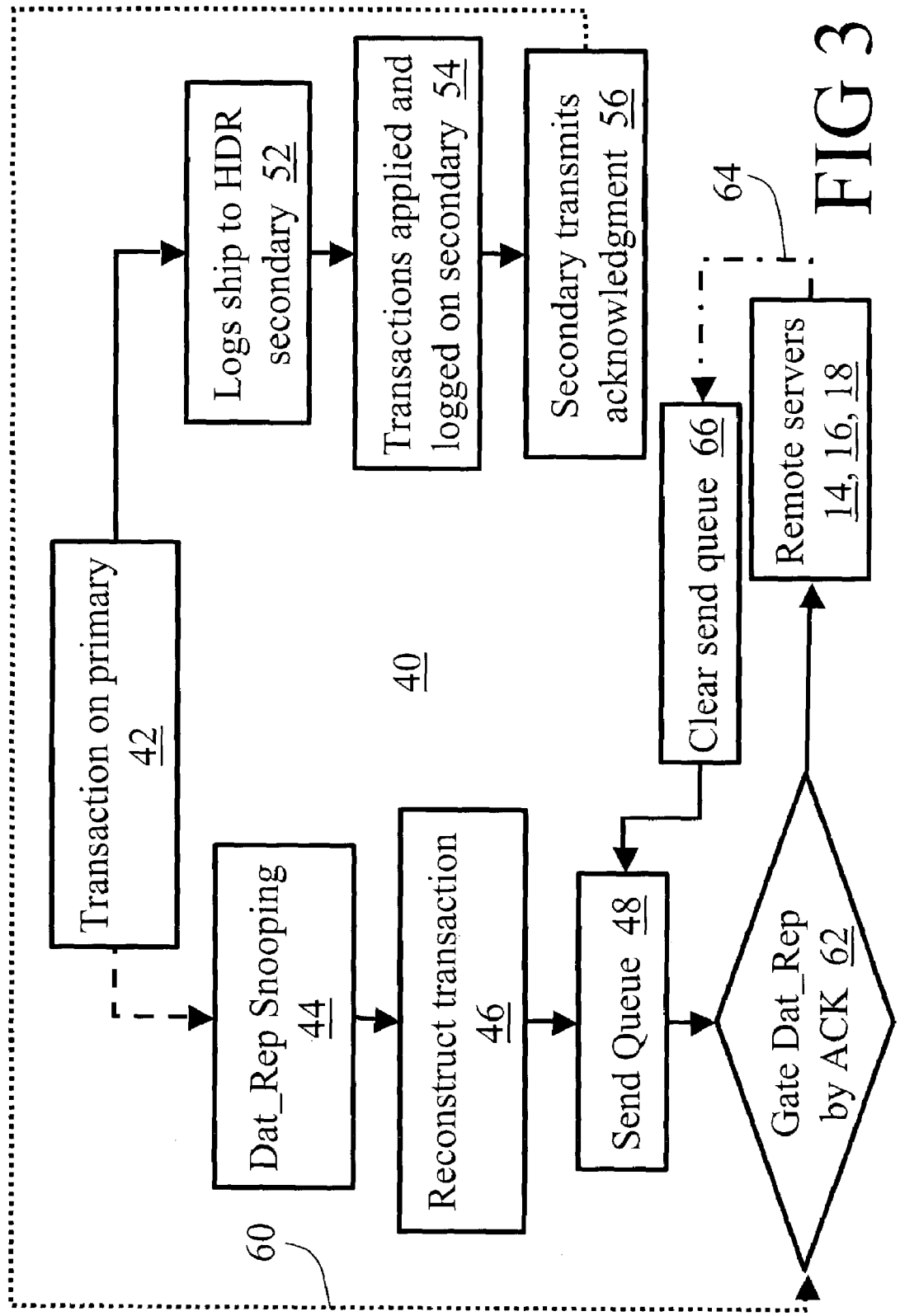
FIG. 3 is a flowchart showing a preferred method for synchronizing logical data replication with highly available data replication.

With continuing reference to FIG. 1 and with further reference to FIG. 3, the preferred data replication method 40 executed by the relational database system 10 is described. A transaction 42 occurs on the primary server 20 of the central database 12. The data replicator 30 monitors, or snoops 44, the log files of the primary server 20 and identifies a log record corresponding to the transaction 42. The data replicator 30 reconstructs 46 the transaction 42 based on the identified transaction log record to generate a replication transaction that is placed in a send queue 48. However, the replication transaction is not immediately sent.

The highly available data replication component 26 also processes the transaction 42, by shipping 52 log files including a log of the transaction 42 to the secondary server 22. The transaction logs are applied and logged 54 at the secondary server 22, and the secondary sever 22 transmits 56 an acknowledgment 60 to the primary server 20.

Responsive to the acknowledgment 60, a transmit gate 62 transmits the corresponding replication transaction in the send queue 48 to the remote servers 14, 16, 18. Each remote server receives, applies, and logs the replication transaction, and generates a replication acknowledgment 64. Responsive to the replication acknowledgment 64, the data replicator 30 clears 66 the corresponding replication transaction from the send queue 48.

Figure 4:
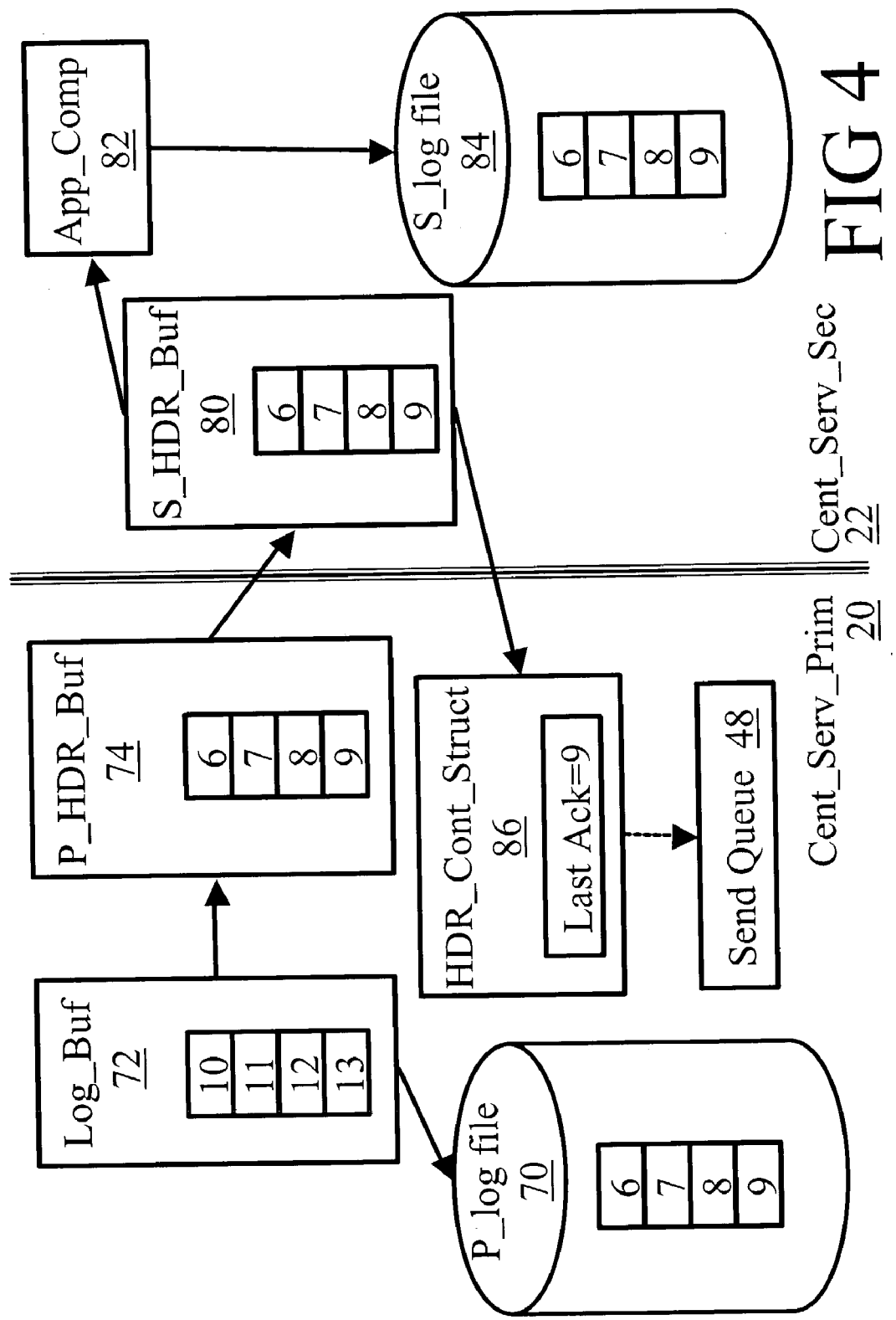
FIG. 4 is a block diagram showing a preferred embodiment of the highly available data replication component that includes communication of a synchronizing acknowledgment signal to a send queue of the logical data replication component.

With reference to FIG. 4, the preferred configuration of the highly available data replication component 26 is described. The component 26 generates a gating signal for synchronizing the data replicator 30 with the highly available data replication component 26. The primary server 20 maintains a primary server log file 70. Recent transactions are stored in a primary server log buffer 72. The contents of the log buffer 72 are from time to time flushed and written to the primary server log file 70 which is stored on a magnetic disk or other non-volatile storage.

As log records are transferred from the primary server log buffer 72 to the primary server log file 70, the buffered log records are also copied to a primary-side buffer 74 of the highly available data replication component 26. From time to time, the contents of the primary side-buffer 74 are transmitted to the secondary server 22 and temporarily stored in a secondary-side buffer 80 of the highly available data replication component 26. A secondary server-side apply component 82 applies the logged transactions to the mirror database on the secondary server 22 and logs the applied transactions in a secondary server log file 84 which is stored on a magnetic disk or other non-volatile storage. After the transactions are applied and logged at the secondary server 22, an acknowledgment is transmitted to the primary server 20 and a control structure 86 of the highly available data replication component 26 is updated with a most recent log position of the primary server log file 70 to be backed up at the secondary server 22.

An example of operation of the primary server log buffer 72 is illustrated in FIG. 4. The state of the buffer reflected in that FIGURE shows that the most recent log records 10–13 are stored. Prior log records 6–9 have been flushed from the primary server log buffer 72, written to the primary server log file 70, and copied to the primary-side buffer 74 of the highly available data replication (HDR) component 26. The log records 6–9 are transferred to the secondary-side buffer 80 of the highly available data replication component 26, applied at the secondary server 22 and logged in the secondary server log file 84.

An acknowledgment is transmitted back to the primary server 20, and the control structure 86 of the highly available data replication component 26 is updated to indicate that the most recently acknowledged back up is the log position 9 of the primary server 20. This indication is communicated to the send queue 48 of the data replicator 30 as a gating signal to commence transmission of corresponding queued replication transactions up to and including the primary log position 9 to target servers.

With reference again to FIGS. 1 and 3, a problem can arise if the transaction 42 is a replication transaction supplied to the central server 12 by the data replicator 30. If the method 40 of FIG. 3 operates in unmodified form on a replication transaction applied to the primary server 20, the replication acknowledgment 64 is sent immediately after the replication transaction is applied and logged at the primary server 20, and the clear operation 66 clears the send queue 48 of the replication transaction. If the primary server 20 fails after the send queue 48 is cleared but before the highly available data replication component 26 copies the transaction to the secondary server 22, then the transaction never reaches the secondary server 22, and a data inconsistency can result.

Figure 5:
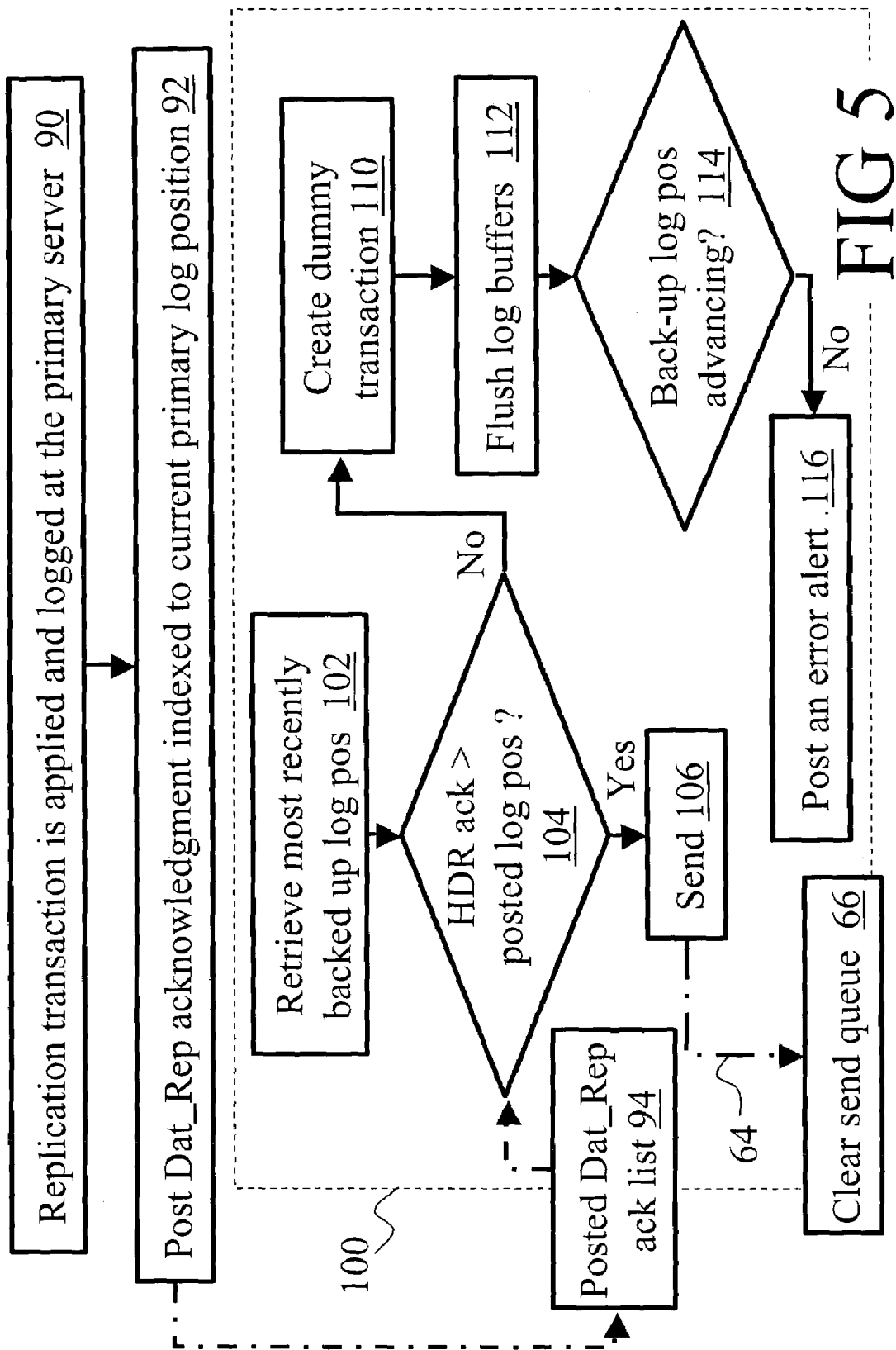
FIG. 5 is a flowchart showing a modification of the process of FIG. 3 for providing robust synchronization of logical data replication with highly available data replication in a case where the logical data replicator sends a replication transaction to the primary server.

With returning reference to FIGS. 1 and 3, and with further reference to FIG. 5, a modification to the method 40 of FIG. 3 is preferably included when the transaction 42 is a replication transaction supplied to the central server 12 by the data replicator 30. The data replication is applied and logged 90 at the primary server 20. However, rather than sending the data replication acknowledgment 64 without delay as shown in FIG. 3, the replication acknowledgment is instead stored 92 in a posted data replication acknowledgment list 94. The posted acknowledgment is associated with the current log position of the primary server log, and is referred to herein as a posted log position.

The posted log position is processed by a designated post monitor computation thread 100 of the data replicator 30. The post monitor computation thread 100 is selectively executed as new posted log positions are added to the posted data replication acknowledgment list 94. The thread 100 is also executed at regular intervals, preferably about once every second. The most recent primary log position backed up by the highly available data replication component 26 is retrieved 102, for example by reading the control structure 86 shown in FIG. 4, and is compared 104 with the posted log position stored in the posted data replication acknowledgment list 94. If the most recently backed up primary log position is more recent than the posted log position, then a send control 106 sends the replication acknowledgment 64 to the queue clear operation 66 of the method 40.

If, however, the posted log position is more recent than the most recently backed up primary log position, this could indicate that the highly available data replication component 26 has stalled or otherwise malfunctioned, and is not mirroring recent transactions. The post monitor computation thread 100 preferably verifies that the highly available data replication component 26 is functioning properly by creating 110 a dummy transaction that is applied at the primary server 20, and forcing a flushing 112 of the primary log buffer 72. The post monitor computation thread 100 then checks 114 whether the backup log is advancing, for example by monitoring the control structure 86 shown in FIG. 4. If it appears that the current log position at the primary server 20 is advancing but the highly available data replication component 26 is stalled, then a suitable alert is posted 116.

The processing modification shown in FIG. 5 is also applicable to synchronization during advancement of the replay position. Since the replay position can be advanced as a result of spooling the in-memory replicated transaction stored in the primary log buffer 72 to disk, it should be assured that the logs of the transaction that copied the in-memory transaction to disk have been successfully shipped to the secondary server 22. Otherwise, the transaction could be lost in the event of a fail-over recovery such as that illustrated in FIG. 2.

In the embodiment described above with reference to FIGS. 1–5, the distributed database system 10 includes the highly available data replication component 26 that transfers log records of the central database primary server 20 to the secondary server 22, and also includes the logical data replicator 30. However, those skilled in the art can readily adapt the described embodiment for synchronizing other or additional types of logical data replicators with other or additional highly available data replication components.

For example, a highly available data replication component communicating with a corresponding secondary server (components not shown) can be included in one or more of the remote servers 14, 16, 18 of the database system 10 to provide a hot backup for that remote server. In such an arrangement, the highly available data replication component associated with the remote server suitably provides an acknowledgment signal to the data replicator 30, and the data replicator 30 suitably delays sending replication transactions originating at the mirrored remote server until the corresponding acknowledgment signal is sent. The data replicator 30 does not communicate directly with the secondary of the remote server, and preferably the remote server and its secondary server appear as a single logical unit to the data replicator 30.

Figure 6:
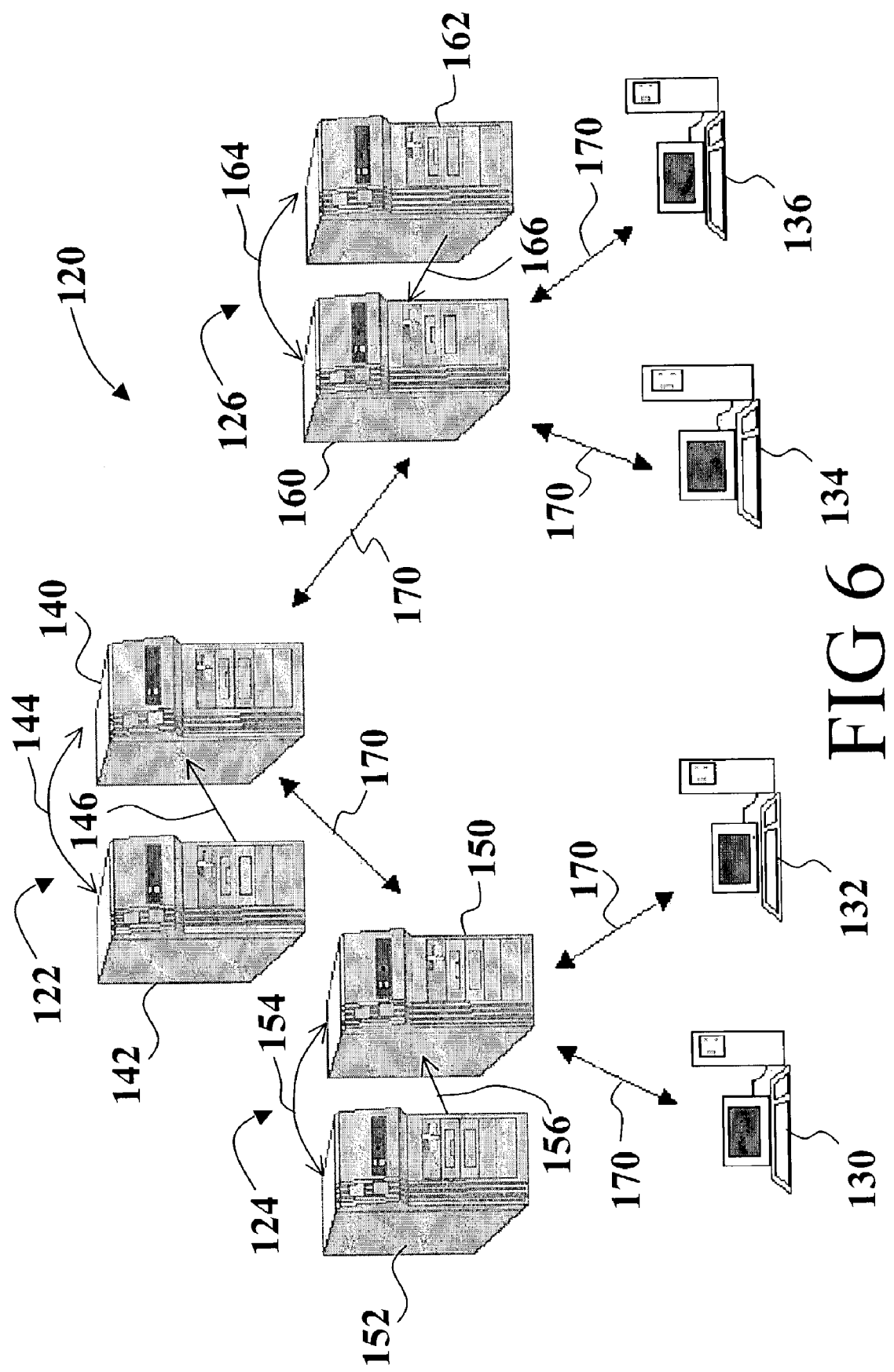
FIG. 6 is a block diagram showing another distributed relational database system, which has a tree topology with three critical nodes, each critical node having a highly available data replication pair including a primary database server and a hot-backup secondary database server, and a logical data replication component for selectively distributing data amongst servers of the tree topology.

With reference to FIG. 6, another distributed database system 120 has a tree topology. Unlike the spokes-and-hub topology of the distributed database system 10, the topology of the distributed database system 120 has more than one critical node. Specifically, the exemplary distributed database system 120 has three critical server nodes 122, 124, 126, along with end-user server nodes 130, 132, 134, 136. To ensure high availability in the event of a failure of a critical node, each critical server node 122, 124, 126 preferably includes a highly available data replication (HDR) pair.

Thus, the critical server node 122 includes a primary server 140 and a secondary server 142 that is maintained as a hot backup by an HDR component 144. The HDR component 144 is preferably substantially similar to the highly available data replication component 26 described previously with reference to the relational database system 10. In particular, the HDR component 144 includes a mirror acknowledgment pathway 146 from the secondary server 142 to the primary server 140 which indicates that a transaction or other critical object has been applied or backed up at the secondary server 142. Similarly, the critical server node 124 includes primary and secondary servers 150, 152, with the secondary server 152 maintained as a hot backup by an HDR component 154 that includes a mirror acknowledgment pathway 156. The critical server node 126 includes primary and secondary servers 160, 162, with the secondary server 162 maintained as a hot backup by an HDR component 164 that includes a mirror acknowledgment pathway 166.

Data replication links 170 between nodes provide selected asynchronous data replication. Similarly to the HDR/logical data replication arrangement of the distributed database system 10, a logical data replication of a transaction or other critical object sourced at one of the critical nodes 122, 124, 126 is queued until the corresponding mirror acknowledgment pathway 146, 156, 166 returns an acknowledgment verifying that the transaction or other critical object has been applied at the secondary server 142, 152, 162. Once the mirror acknowledgment is received, the asynchronous data replication link 170 processes the transaction or other critical object to replicate the transaction or other critical object at selected servers.

Moreover, the data replication links 170 communicate with the critical nodes 122, 124, 126 as single logical entities, preferably by communication with the primary server 140, 150, 160 of each respective critical node 122, 124, 126. The data replication links 170 preferably do not communicate with the secondary servers 142, 152, 162 as logical entities distinct from the respective critical nodes 122, 124, 126.

In the tree topology employed in the distributed database system 120, replication traffic may traverse critical nodes during transfer from a source to a destination. For example, if a transaction applied at the server 130 is to be replicated at the server 134, the corresponding transaction replication traverses the critical server node 124, the critical server node 122, and the critical server node 126 en route to the final destination server 134. At each intermediate critical node 124, 122, 126, the transaction is a critical object which is backed up at the corresponding secondary server 152, 142, 162. At each intermediate critical node 124, 122, 126, the logical replication via one of the logical replication links 170 to the next node in the transmission chain is queued until acknowledgment of the backup at that intermediate node is received.

The tree topology of the distributed database system 120 is exemplary only. Additional branches, critical nodes, and end-user servers are readily included. One or more of the critical nodes can also be used for end-user access. Other topologies that include multiple critical nodes can be similarly configured to ensure high data availability at each critical node. Generally, to provide robust failover for any critical node that includes highly available data replication (HDR), each critical object applied to that critical node is applied on the secondary server of the HDR pair before the critical object is processed by the logical data replication system.

In the exemplary embodiments of FIGS. 1–6 the nodes referred to as critical nodes, namely the nodes 12, 122, 124, 126, are those nodes that provide the hub or branch interconnections of the distributed database network. Failure of one of these interconnection nodes impacts more than just the failed node, and so HDR backup protection is typically desirable for such interconnection nodes. However, in general a critical node includes any node which the user views as sufficiently important or critical to justify providing HDR protection for that node. Hence, a particularly important end-node (such as one or more of the end-nodes 14, 16, 18, 130, 132, 134, 136) is optionally included as a critical node and provided with HDR protection. Similarly, although in the preferred embodiments each interconnection node is provided with HDR protection, HDR protection is optionally omitted from one or more interconnection nodes at the user's discretion.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A database apparatus comprising:
   a critical database server including a primary server supporting a primary database instance and a secondary server supporting a secondary database instance that mirrors the primary database instance, the secondary server generating an acknowledgment signal indicating that a selected critical database transaction at the primary database instance is mirrored at the secondary database instance, the critical databases server including a mirroring component communicating with the primary and secondary servers to transfer database log file entries of the primary database instance to the secondary server, the secondary server applying and logging the transferred database log file entries to the secondary database instance and producing said acknowledgement signal subsequent to the applying and logging of the selected critical database transaction, wherein the mirroring component includes a control structure that indexes critical database transactions that are applied and logged at the secondary database instance, the acknowledgement signal corresponding to indexing in the control structure of at least one of the selected critical database transaction and a critical database transaction that commits after the selected critical database transaction;

a plurality of other servers each supporting corresponding database instances; and a data replicator communicating with the critical database server and the plurality of other servers to replicate the selected critical database transaction on at least one of said plurality of other servers responsive to the acknowledgment signal.

2. The database apparatus as set forth in claim 1, wherein the primary and secondary servers of the critical database server are remotely located from one another, the database apparatus further including:

a communication network that communicates data between the primary and secondary servers and between the critical database server and the other servers.

3. The database apparatus as set forth in claim 1, wherein the data replicator includes:

a send queue that stores one or more transactions that effect replication of the selected critical database transaction.

4. A database apparatus comprising:

a critical database server including a primary server supporting a primary database instance and a secondary server supporting a secondary database instance that mirrors the primary database instance, the secondary server generating an acknowledgment signal indicating that a selected critical database transaction is mirrored at the secondary database instance;

a plurality of other servers each supporting a database; and, a data replicator communicating with the critical database server and the plurality of other servers to replicate the selected critical database transaction on at least one of said plurality of other servers responsive to the acknowledgment signal, the data replicator including a send queue that stores one or more transactions that effect replication of the selected critical database transaction, wherein the selected critical database transaction is received by the critical database server from the data replicator, and wherein the data replicator further includes:

a replication acknowledgment queue that buffers a replication acknowledgment sent by the critical database server to the data replicator; and a mirror monitor that transmits the queued replication acknowledgment to one of the other servers responsive to the acknowledgment signal.

5. Apparatus for supporting an associated distributed relational database including a primary server supporting a primary database instance with a primary database instance log file, a secondary server supporting a secondary database instance with a secondary instance log file, and a plurality of other servers each supporting a database instance, the apparatus comprising:

a highly available data replication component communicating with the primary and secondary servers to transfer primary database instance log file entries from the primary server to the secondary server, the secondary server producing an acknowledgment indicating that the transferred log file entries have been received;

a logical data replication component communicating with the primary server and the other servers to identify a log record in the primary database instance log file, construct a replication transaction corresponding to the identified log record, and, responsive to the highly available data replication component indicating that the identified log record has been received at the secondary server, cause one or more of the other servers to perform the replication transaction, wherein the logical data replication component produces computation threads for replicating transactions; and, a thread-verification component that terminates a computation thread if it is communicating with the secondary server.

6. Apparatus for supporting an associated distributed relational database including a primary server supporting a primary database instance with a primary database instance log file, a secondary server supporting a secondary database instance with a secondary instance log file, and a plurality of other servers each supporting a database instance, the apparatus comprising:

a highly available data replication component communicating with the primary and secondary servers to transfer primary database instance log file entries from the primary server to the secondary server, the secondary server producing an acknowledgment indicating that the transferred log file entries have been received;

a logical data replication component communicating with the primary server and the other servers to identify a log record in the primary database instance log file, construct a replication transaction corresponding to the identified log record, and, responsive to the highly available data replication component indicating that the identified log record has been received at the secondary server, cause one or more of the other servers to perform the replication transaction; and, a critical node database server logical entity that communicates with the logical data replication component as a single logical entity, the critical node database server logical entity representing the primary and secondary servers.

7. Apparatus supporting an associated distributed relational database including a primary server supporting a primary database instance with a primary database instance log file, a secondary server supporting a secondary database instance with a secondary instance log file, and a plurality of other servers each supporting a database instance, the apparatus comprising:

a highly available data replication component communicating with the primary and secondary servers to transfer primary database instance log file entries from the primary server to the secondary server, the secondary server producing an acknowledgment indicating that the transferred log file entries have been received, wherein the highly available data replication component includes an acknowledgment log index that identifies a position in the primary database instance log file corresponding to a most recent primary database instance log file entry transferred from the primary server to the secondary server and acknowledged by the secondary server, the indication that the identified log record has been received at the secondary server corresponding to the acknowledgment log index identifying a position in the primary database instance log file that is more recent than the identified log record; and a logical data replication component communicating with the primary server and the other servers to identify a log record in the primary database instance log file, construct a replication transaction corresponding to the identified log record, and, responsive to the highly available data replication component indicating that the identified log record has been received at the secondary server, cause one or more of the other servers to perform the replication transaction.

8. Apparatus supporting an associated distributed relational database including a primary server supporting a primary database instance with a primary database instance log file, a secondary server supporting a secondary database instance with a secondary instance log file, and a plurality of other servers each supporting a database instance, the apparatus comprising:

a highly available data replication component communicating with the primary and secondary servers to transfer primary database instance log file entries from the primary server to the secondary server, the secondary server producing an acknowledgment indicating that the transferred log file entries have been received;

a logical data replication component communicating with the primary server and the other servers to identify a log record in the primary database instance log file, construct a replication transaction corresponding to the identified log record, and, responsive to the highly available data replication component indicating that the identified log record has been received at the secondary server, cause one or more of the other servers to perform the replication transaction, wherein the logical data replication component produces computation threads for replicating transactions, and the logical data replication component includes: a thread terminator which terminates a computation thread responsive to a replication acknowledgment indicating a replication transaction generated by the computation thread has been performed by one or more servers.

9. The apparatus as set forth in claim 8, wherein the logical data replication component further includes:

a replication acknowledgment buffer that stores a replication acknowledgment received from the primary server indicating the primary server has performed the replication transaction generated by the computation thread, the replication acknowledgment buffer transmitting the replication acknowledgment to the computation thread responsive to the highly available data replication component indicating that the replication transaction generated by the computation thread has been received at the secondary server.

10. Apparatus supporting an associated distributed relational database including a primary server supporting a primary database instance with a primary database instance log file, a secondary server supporting a secondary database instance with a secondary instance log file, and a plurality of other servers each supporting a database instance, the apparatus comprising:

a highly available data replication component communicating with the primary and secondary servers to transfer primary database instance log file entries from the primary server to the secondary server, the secondary server producing an acknowledgment indicating that the transferred log file entries have been received;

a logical data replication component communicating with the primary server and the other servers to identify a log record in the primary database instance log file, construct a replication transaction corresponding to the identified log record, and, responsive to the highly available data replication component indicating that the identified log record has been received at the secondary server, cause one or more of the other servers to perform the replication transaction, wherein the distributed relational database further includes a second primary server supporting a second primary database instance with a second primary database instance log file, and a second secondary server supporting a second secondary database instance with a second secondary database instance log file;

a second highly available data replication component communicating with the second primary and second secondary servers to transfer second primary database instance log file entries from the second primary server to the second secondary server, the second secondary server producing a second acknowledgment indicating that the transferred log file entries have been received; and wherein the logical data replication component additionally communicates with the second primary server and the second secondary server to identify a second log record in the second primary database instance log file, construct a second replication transaction corresponding to the identified second log record, and, responsive to the second highly available data replication component indicating that the identified second log record has been received at the second secondary server, cause at least one of the other servers and the primary server to perform the second replication transaction.

* * * * *